United States Patent Office 3,814,762
Patented June 4, 1974

3,814,762
4-THIOSEMICARBAZIDO-5-PYRIMIDINE-
CARBOXYLIC ACID ALKYL ESTERS
Arthur A. Santilli, Havertown, and Dong H. Kim, Wayne,
Pa., assignors to American Home Products Corporation, New York, N.Y.
No Drawing. Filed Oct. 30, 1972, Ser. No. 302,304
Int. Cl. C07d 51/36
U.S. Cl. 260—256.5 R         4 Claims

ABSTRACT OF THE DISCLOSURE 2-methylthio and 2-phenyl-4-thiosemicarbazido-5-pyrimidinecarboxylic acid, lower alkyl ester have CNS-depressant activity.

---

This invention relates to new and pharmacologically active 2-methylthio- and 2-phenyl-4-thiosemicarbazido-5-pyrimidinecarboxylic acid, lower alkyl esters. 4-hydrazino-2-methylthio-5-pyrimidinecarboxylic acids are described by M. Hauser et al. J. Org. Chem., 25, 1570 (1960).

The invention sought to be patented comprises chemical compounds of the structural formula:

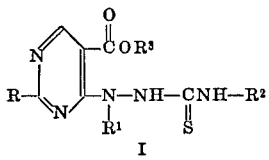

I wherein R is phenyl or methylthio; $R^1$ is hydrogen or phenyl; $R^2$ is hydrogen or lower alkyl; and $R^3$ is lower alkyl.

As employed herein and in the claims "lower alkyl" means the methyl, ethyl, propyl or butyl groups.

The compounds of Formula I exert a depressant action on the central nervous system as demonstrated by evaluation in standard pharmacological test procedures.

The compounds of Formula I are prepared by reacting a 4-chloro-2-phenyl-5-pyrimidinecarboxylic acid, lower alkyl ester with a suitable 3-thiosemicarbazide at reflux temperature in ethanol in the presence of sodium bicarbonate.

The starting materials employed in the aforedescribed processes are either known compounds or can be prepared from known compounds by conventional methods.

When the compounds of the invention are employed as depressants of the central nervous system, they may be administered alone or in combination with pharmaceutically acceptable carriers, the proportion of which is determined by the solubility and chemical nature of the compound, chosen route of administration, and standard pharmaceutical practice. For example, they may be administered orally in the form of tablets or capsules containing such excipients as starch, lactose, magnesium stearate, and so forth. They may be administered orally in the form of solution or they may be injected parenterally, e.g. intramuscularly. For parenteral administration, they may be used in the form of a sterile solution or suspensions containing other solutes, for example, enough saline or glucose to make the solution isotonic.

The dosage of the present pharmacologically active agents will vary with the form of administration and the particular compound chosen. Furthermore, it will vary with the particular subject under treatment. Generally, treatment is initiated with small dosages substantially less than the optimum dose of the compound. Thereafter, the dosage is increased by small increments until the optimum effect under the circumstances is reached. It will generally be found that when the composition is administered orally, larger quantities of the active agent will be required to produce the same effect as a smaller quantity given parenterally. In general, the compounds of this invention are most desirably administered at a dosage level that will generally afford effective results without causing any harmful or deleterious side effects.

The manner and process of making and using the invention are illustrated in the following examples, where all temperatures are given in degrees Centigrade.

EXAMPLE I 4-(4-methyl-3-thiosemicarbazido)-2-phenyl-5-pyrimidinecarboxylic acid, ethyl ester A stirred mixture of 7.9 g. of 4-chloro-2-phenyl-5-pyrimidinecarboxylic acid, ethyl ester, 3.15 g. of 4-methyl-3-thiosemicarbazide and 1.5 g. of sodium bicarbonate in 250 ml. of ethanol is heated under reflux for 3 hours. The mixture is then filtered, and the filtrate cooled in an ice bath. The precipitate formed thereby is recrystallized from ethanol. Yield of the title compound 2.7 g.; M.P. 216–127°.

Analysis for $C_{15}H_{17}N_5O_2S$.—Calculated: C, 54.37; H, 5.17; N, 21.13; S, 9.67. Found: C, 54.60; H, 4.96; N, 20.62; S, 9.92.

EXAMPLE II 2-phenyl-4-(thiosemicarbazido)-5-pyrimidine-carboxylic acid, ethyl ester A stirred mixture of 7.9 g. of 4-chloro-2-phenyl-5-pyrimidinecarboxylic acid, ethyl ester, 2.7 g. of thiosemicarbazide and 2.5 g. of sodium carbonate in 150 ml. of ethanol is heated under reflux for 3 hours. The reaction mixture is cooled in ice and filtered. The filter cake is washed with 100 ml. of water and recrystallized from aqueous dimethylformamide. Yield of the title compound, 6.3 g.; M.P. 221–224°.

Analysis for $C_{14}H_{15}N_5O_2S$.—Calculated: C, 52.82; H, 5.07; N, 21.99; S, 10.07. Found: C, 53.14; H, 4.79; N, 21.87; S, 9.70.

EXAMPLE III 2-methylthio-4-(1-phenyl-3-thiosemicarbazido)-5-pyrimidinecarboxylic acid, ethyl ester A stirred mixture of 6.98 g. of 4-chloro-2-methylthio-5-pyrimidinecarboxylic acid, ethyl ester, 5 g. of 1-phenyl-3-thiosemicarbazide and 2.5 g. of sodium bicarbonate in 75 ml. of ethanol is heated under reflux for 3 hours. The reaction mixture is cooled in ice and filtered. The filter cake is washed with 100 ml. of water and then recrystallized from ethanol. Yield of the title compound, 2.2 g.; M.P. 187–189°.

Analysis for $C_{13}H_{11}N_5OS_2$.—Calculated: C, 49.57; H, 4.71; N, 19.27; S, 17.64. Found: C, 49.28; H, 5.00; N, 19.15; S, 17.85.

EXAMPLE IV

A compound of Formula I is administered orally (P.O.) or intraperitoneally (IP) to each of three mice. The animals are observed for signs of CNS-depressant activity, such as decreased motor activity, sedation, ataxia, loss of righting reflex, and decreased respiration. When tested as above-described, 4-(4-methyl-3-thiosemicarbazido)-2-phenyl-5-pyrimidinecarboxylic acid, ethyl ester showed decreased motor activity and decreased respiration at 40 mg./kg. (IP);

2-phenyl-4-(thiosemicarbazido)-5-pyrimidinecarboxylic acid, ethyl ester showed decreased motor activity and decreased respiration at 12.7 mg./kg. (IP); and 2-methylthio-4-(1-phenyl-3-thiosemicarbazido)-5-pyrimidinecarboxylic acid, ethyl ester showed decreased motor activity and decreased respiration at 127 mg./kg. (IP).

What is claimed is:
1. A compound of the formula:

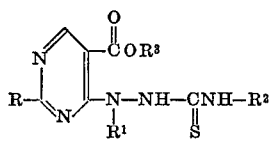

wherein R is phenyl or methylthio; $R^1$ is hydrogen or phenyl; $R^2$ is hydrogen or lower alkyl; and $R^3$ is lower alkyl.

2. A compound as defined in claim 1 which is: 4-(4-methyl - 3 - thiosemicarbazido)-2-phenyl-5-pyrimidinecarboxylic acid, ethyl ester.

3. A compound as defined in claim 1 which is: 2-phenyl-4-(thiosemicarbazido)-5-pyrimidinecarboxylic acid, ethyl ester.

4. A compound as defined in claim 1 which is: 2-methylthio - 4 - (1-phenyl-3-thiosemicarbazido)-5-pyrimidinecarboxylic acid, ethyl ester.

References Cited

UNITED STATES PATENTS 3,732,227   5/1973   Kim et al. _____ 260—256.4 N

RICHARD J. GALLAGHER, Primary Examiner

U.S. Cl. X.R.

424—251